US008838022B2

(12) United States Patent
Dobyns (10) Patent No.: US 8,838,022 B2
(45) Date of Patent: Sep. 16, 2014

(54) SYSTEM AND METHOD FOR SECURELY PAIRING A WIRELESS DEVICE USING WIRELESS COMMUNICATION

(75) Inventor: Douglas Howard Dobyns, Lindon, UT (US)

(73) Assignee: Radeum, Inc., Orem, UT (US)

( * ) Notice: Subject to any disclaimer, the term of this patent is extended or adjusted under 35 U.S.C. 154(b) by 338 days.

(21) Appl. No.: 13/086,291

(22) Filed: Apr. 13, 2011

(65) Prior Publication Data

US 2012/0178364 A1 Jul. 12, 2012

Related U.S. Application Data

(60) Provisional application No. 61/323,791, filed on Apr. 13, 2010.

(51) Int. Cl.
*H04B 5/00* (2006.01)
*H04B 7/00* (2006.01)
*H04B 17/00* (2006.01)
*H04M 1/725* (2006.01)

(52) U.S. Cl.
CPC .................... *H04M 1/7253* (2013.01)
USPC .... 455/41.1; 455/41.2; 455/67.12; 455/67.14

(58) Field of Classification Search
CPC ....... H04M 1/7253; H04L 9/08; H04K 3/825; H05K 9/0069; H05K 9/0043; H05K 9/0003; G01R 29/0814
USPC ................................. 455/41.1, 41.2
See application file for complete search history.

(56) References Cited

U.S. PATENT DOCUMENTS

| | | | | |
|---|---|---|---|---|
| 5,594,200 A | * | 1/1997 | Ramsey | 174/382 |
| 5,908,043 A | * | 6/1999 | Paes et al. | 135/139 |
| 6,487,403 B2 | * | 11/2002 | Carroll | 455/419 |
| 6,525,657 B1 | * | 2/2003 | Wojcik | 340/514 |
| 7,065,655 B1 | * | 6/2006 | Jakobsson | 713/194 |
| 7,277,547 B1 | * | 10/2007 | Delker et al. | 380/270 |
| 7,577,620 B1 | | 8/2009 | Donner | |
| 7,987,364 B2 | * | 7/2011 | Kaechi | 713/169 |
| 8,665,607 B2 | * | 3/2014 | Bouza et al. | 361/800 |
| 2003/0056114 A1 | * | 3/2003 | Goland | 713/201 |
| 2004/0009768 A1 | * | 1/2004 | Waters et al. | 455/422.1 |
| 2004/0203962 A1 | * | 10/2004 | Dutton et al. | 455/466 |
| 2005/0197093 A1 | * | 9/2005 | Wiklof et al. | 455/343.1 |
| 2005/0265552 A1 | * | 12/2005 | Olson et al. | 380/270 |
| 2006/0058053 A1 | * | 3/2006 | Jatschka | 455/522 |

(Continued)

FOREIGN PATENT DOCUMENTS

JP 2006105901 A * 4/2006 ............ G01R 29/08
WO WO 2009/095295 8/2009

*Primary Examiner* — Temesgh Ghebretinsae
*Assistant Examiner* — Devan Sandiford
(74) *Attorney, Agent, or Firm* — Thorpe North & Western LLP (57) ABSTRACT

Various embodiments of an invention for pairing a plurality of wireless devices using wireless communications are disclosed. A method for pairing a wireless device comprises placing the wireless device in a pairing enclosure. The pairing enclosure includes a shielding layer to substantially attenuate a pairing signal emitted within the pairing enclosure. A pairing signal transmitted through the pairing enclosure is received at a pairing signal receiver configured to detect a power level of the pairing signal. An indication is made regarding whether the pairing procedure can begin, proceed, or be terminated based on the power level of the pairing signal detected by the paring signal receiver.

40 Claims, 3 Drawing Sheets

(56) References Cited

U.S. PATENT DOCUMENTS

| | | | |
|---|---|---|---|
| 2006/0182877 A1* | 8/2006 | Creasy et al. | 427/96.3 |
| 2006/0187061 A1* | 8/2006 | Colby | 340/572.8 |
| 2007/0032195 A1* | 2/2007 | Kurisko et al. | 455/41.2 |
| 2007/0106892 A1 | 5/2007 | Engberg | |
| 2007/0149237 A1* | 6/2007 | Russell et al. | 455/522 |
| 2007/0249383 A1* | 10/2007 | Wiklof et al. | 455/522 |
| 2008/0076572 A1* | 3/2008 | Nguyen et al. | 463/42 |
| 2008/0146265 A1 | 6/2008 | Valavi | |
| 2008/0184345 A1* | 7/2008 | Kaechi | 726/5 |
| 2008/0238676 A1* | 10/2008 | Dhillon et al. | 340/572.1 |
| 2008/0298587 A1* | 12/2008 | Luk et al. | 380/255 |
| 2009/0129347 A1* | 5/2009 | Woo | 370/338 |
| 2009/0251379 A1 | 10/2009 | Nikitin et al. | |
| 2010/0289627 A1* | 11/2010 | McAllister et al. | 340/10.42 |
| 2011/0232956 A1* | 9/2011 | Ramsey | 174/382 |

* cited by examiner

SYSTEM AND METHOD FOR SECURELY PAIRING A WIRELESS DEVICE USING WIRELESS COMMUNICATION

CROSS-REFERENCE

Priority of U.S. Provisional patent application Ser. No. 61/323,791 filed on Apr. 13, 2010 is claimed, and is hereby incorporated by reference in its entirety.

BACKGROUND

The use of electronic devices that can communicate wirelessly is quickly becoming ubiquitous in society. For example, it is a common practice in daily life to use mobile phones, portable computing devices, wireless headsets and ear pieces, wireless connections of electronic devices with automobiles, the internet, and other types of computing devices having wireless communication abilities. A wide variety of wireless standards for wireless communications have been developed including Bluetooth®, Zigbee®, Wibree®, the $3^{rd}$ Generation Partnership Project (3GPP), the Institute of Electrical and Electronics Engineers (IEEE) standards 802.11, 802.15 and 802.16, and so forth.

Wireless communication has become even more important in military use, where the need for wireless communication solutions in military applications is increasing as today's war fighter is becoming more and more complex in an effort to make the war fighter safer and more effective.

Sending information using wireless communications means, such as those listed above, can provide significant security risks. As the data is transmitted into free space, it becomes available for any party to receive. Reducing the risk of sending the data to an unwanted party can be accomplished using a number of techniques. One technique to reduce the risk of sending the data to unwanted groups or individuals is to encrypt the data. Wireless data encryption standards include the Wired Equivalent Privacy (WEP) standard, the Wi-Fi protected access (WPA) standard, and various standards used by the government and military including the Advanced Encryption Standard (AES) 128, AES 256, Type 1, Type 2, Type 3, Type 4, Suite A and Suite B classifications, to name a few. Another technique used to protect transmitted data is through the use of an electronic handshake between two wireless devices. The handshake is also commonly referred to as pairing.

Pairing and encryption are typically accomplished by the transfer of encryption keys. As the encryption keys and other necessary information are communicated between the wireless devices, this information may be intercepted by an undesired party. Once the undesired party has access to the pairing and/or encryption information, they may continue to intercept wireless communications from users that the user believes is being communicated over a secure wireless link.

While data transmitted with wireless devices can be protected through the use of encryption and pairing, the devices can be at their most vulnerable when the encryption process and/or pairing is conducted since the keys for deciphering encryption are often communicated at this time. Knowledge of this information can also be used to reverse engineer or decrypt other secure systems that use the same encryption algorithms. This can lead to the need to develop and implement new encryption algorithms, which can be an incredibly costly and time consuming process.

One method to enable secure communication between wireless devices is to require that encryption and pairing protocols are communicated over a secure link, such as a wired or fiber optic link between the two devices. However, this can be impractical based on the design of the wireless devices, and the amount of time it takes to physically connect the devices to the wired or fiber optic link. For persons having multiple devices, the time it takes to physically connect the devices and exchange encryption information can significantly reduce the benefits of using wireless devices.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Definitions

As used herein, the term "substantialcorrected, DD.ly" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The ability to send secure command, control, and communication information using wireless devices has revolutionized communication. From Main Street to the military, the use of wireless devices has increased efficiency and made peoples lives more convenient and businesses more profitable.

The number of wireless links used by the armed forces has increased dramatically. For example, military personnel may have a wide number of wireless devices that are used each day in combat and support missions, including radios, microphones, head sets or ear pieces, vehicle intercoms, outer vehicle communications used to provide perimeter checks, mobile command centers using multiple forms of wireless communication, wireless keyboards, wireless computer mice, GPS receivers, digital gun locks, and so forth. Wireless devices can be used for short distance communication in personal area networks (PANs) or for relatively long distance communication using high powered wireless radios.

Wireless devices typically communicate by modulating data on the electrical wave of an electromagnetic wave and transmitting the information on electromagnetic waves. However, other types of communication are also possible, such as through the use of near field magnetic induction, wherein data is modulated on a non-propagating magnetic field and communicated to nearby devices within the magnetic field.

Signals transmitted on an electromagnetic wave typically degrade in power at a rate of one over the square of the distance from the transmission source. Thus, at a distance of 10 meters, the power of a signal transmitted on an electromagnetic wave will decreased to approximately $1/100$ of its original power. Signals communicated on a magnetic field typically degrade at a rate of one over the sixth power of the distance. Thus, at a distance of 10 meters from the source, a near field magnetic induction signal will decrease to $1/1,000,000$ of the original power.

Secure communication using these devices, whether on Wall Street or on a battle field, can provide significant advantages. Encryption is typically used to considerably reduce the risk of the transmitted data being intercepted and used by anyone other than the intended party. In the military space this is commonly referred to as Low Probability of Interception (LPI). Selected types of communication, such as near field magnetic induction, can also be used to provide a Low Probability of Detection (LPD) due to the rapid roll off in transmitted power.

The implementation of encryption in wireless devices typically involves loading and sharing encryption keys into each secure wireless device. In the military, a new encryption key may be used each day. A different encryption key may even be used for different missions on the same day. Transmitting the encryption keys to the wireless devices using a wireless transmission means can be very risky, as it may enable undesired individuals or groups to obtain the encryption key. One way to limit the transmission of unwanted information during the pairing/programming process is through direct, wired communication.

However, the time it takes for a person to physically connect his or her multiple wireless devices to a wired system to load an encryption key for each device can be burdensome. For example, a soldier operating in a combat field may not have the time to connect each wireless device in times of emergency.

A wireless device that has not been programmed to receive an updated encryption key may not be capable of communicating; thereby rendering the device useless and reducing the technological advantage the wireless device created for the military personnel.

The increase in the use of wireless electronic devices in the military increases the amount of connections and cables interconnecting these multiple devices. For example, multiple wireless devices may be connected into an on-the-body personal area network (PAN). The increase in mechanical connections and cables is an area of concern to the military, as the cables can be the primary point of failure in many of today's wired, electronic PAN systems due to dry rot, fatigue, and breakage.

In addition, the large number of cable connections adds increased weight, setup complexity and preparation time. These cables also provide a danger as they can be grabbed or snagged as a soldier moves through tactical situations.

Complex personal area network systems that rely on a mechanical interconnection require that each device be designed with the system-wide interconnection topology in mind. For example, a master communication hub may be designed to allow for six (6) slave devices to be connected. If an additional device were to be added to the system, it would require the master to be replaced with an upgraded model including at least seven (7) mechanical connection points. Upgrading hundreds or thousands of master communication hubs can be costly and labor intensive.

A wireless system may accommodate the addition of another slave device via a software upgrade, which would generally be less expensive and easier to implement. Thus, wireless systems provide the advantage of being more forward compatible with future devices. This is critical in today's electronic world, where technology is changing at an ever increasing rate.

Due to the complexity of paring/programming multiple wireless devices via corded connections, there is a risk that one device may not be programmed properly. If this is the case, it may take time to identify the non-paired/programmed device. It may be necessary to unplug all devices after initial pairing/programming to ensure full functionality in a truly wireless condition. If the "unplugged" test fails, it may require that all devices be reconnected and retested for the proper program or pairing information. If this fails, pairing may require that each device be connected one at a time. A wireless pairing/programming system can quickly communicate to all devices simultaneously or one at time without the need for timely manual connections. This allows each device to be wirelessly verified for the correct pairing or programming in a wireless verification process.

In order to enable a person having multiple wireless devices to pair the devices or otherwise provide a form of encryption for a data transmission from the devices using wireless communication, while minimizing the risk of transmitting critical information such as an encryption key to undesired parties, a system and method for securely pairing a plurality of wireless devices using wireless communication is disclosed.

The term "pairing", as used herein, is intended to mean the communication of information between wireless devices which is used to allow the devices to communicate. The information can also be used to increase the security of communication between two or more devices. This may include the transmission of one or more public or private encryption keys between the wireless devices. Additional information to increase communication security can also be shared such as transmission frequency, data channel, a unique pairing identification (ID) number, pseudorandom noise (PN) code, modulation scheme, frequency hopping schedule, and so forth. In addition, multiple devices can be "paired" to enable each device to communicate using a designated encryption or other type of security measure. The pairing procedure can also involve the communication of programming information. For example, software and/or firmware can be wirelessly communicated to a communication device during the pairing procedure.

The pairing procedure can usually be initiated by entering a specific key combination on one or more devices to instruct the device(s) to undertake a predetermined communication that includes the sharing of information and/or programming. Alternatively, a wireless signal can be transmitted to a wireless device instructing the device to proceed with a pairing procedure. Any type of process used to enable two or more wireless devices to communicate wirelessly transmitted data can be used with the systems and methods disclosed herein.

In one example embodiment, a person can place his or her multiple wireless devices in a pairing enclosure configured to substantially attenuate signals that are communicated during a pairing procedure. The pairing enclosure can be tested, on a periodic basis, or every time it is used, to verify that the enclosure substantially attenuates wireless signals transmitted by the multiple wireless devices. Once a successful test has been performed, the multiple wireless devices can be paired within the pairing enclosure. This enables the pairing procedure to be completed wirelessly, without the need to connect each wireless device to a wired system. By substantially attenuating the signals transmitted within the pairing enclosure, the risk of an unwanted party being able to receive the signals that are transmitted during the pairing procedure is largely eliminated.

Figure 1:
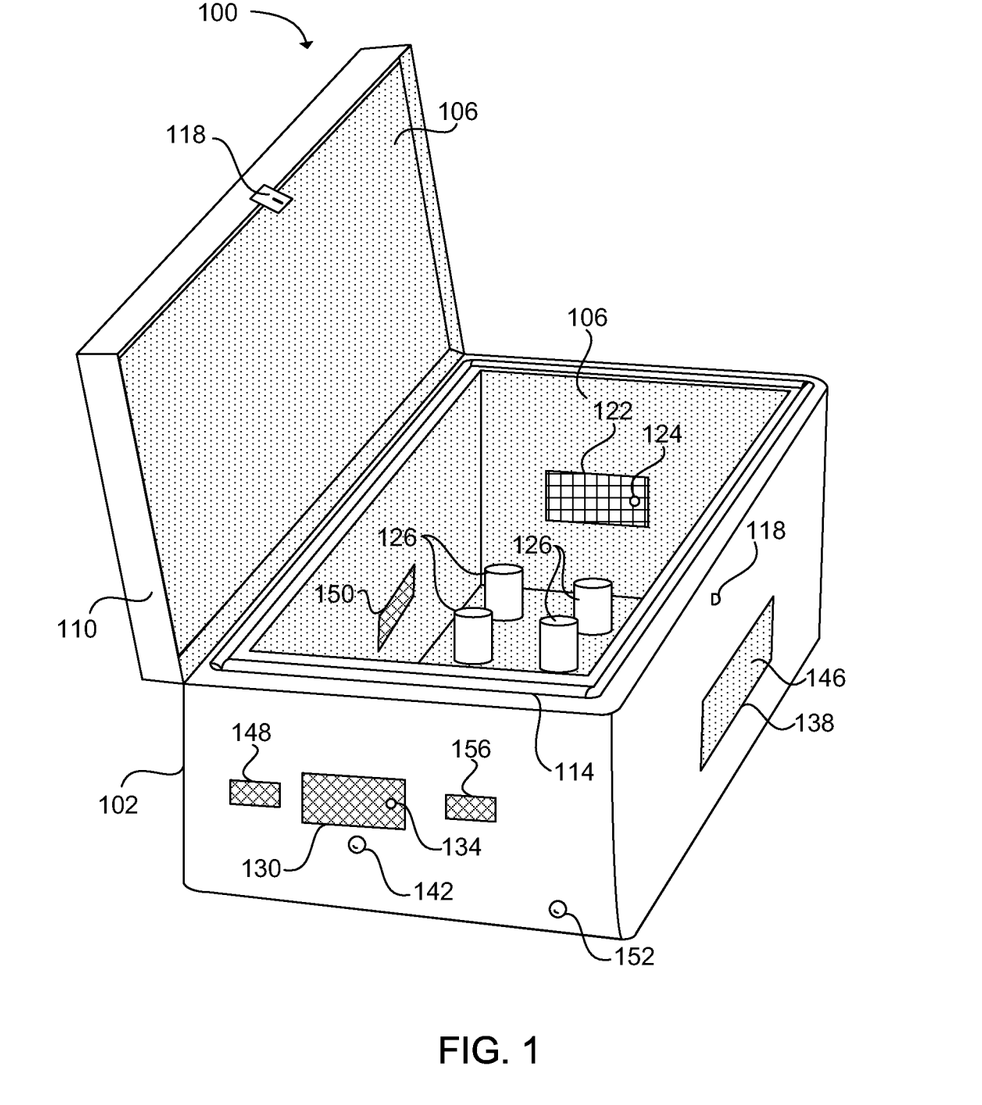
FIG. 1 illustrates an exemplary system for securely pairing a plurality of wireless devices using wireless communication in accordance with an embodiment of the present invention.

One exemplary system 100 for pairing a plurality of wireless devices 126 using wireless communication is illustrated in FIG. 1. The system is comprised of a pairing enclosure 102 having a shielding layer 106 forming a shielded region to substantially attenuate a radio frequency signal emitted within the pairing enclosure. The shielding layer can also be configured to substantially attenuate magnetic fields emitted within the enclosure 102. The pairing enclosure can be sized based on the size and number of wireless devices 126 that are placed within the enclosure. In one embodiment, the enclosure 102 may be relatively small, such as the size of a book or lunchbox. A user can place several small wireless devices in the enclosure to allow the items to be securely paired within the enclosure. Alternatively, the pairing enclosure can be relatively large, such as a room or tent in which one or more persons can enter to allow the wireless devices on their person to be paired. The pairing enclosure can be sufficiently large that a vehicle full of wireless devices, such as a personnel carrier with a wireless intercom and a dozen soldiers, each wearing multiple wireless devices, can enter the pairing enclosure to enable selected wireless devices in the vehicle to undergo a secure pairing procedure at a single instance. This will be discussed more fully below.

In the example embodiment illustrated in FIG. 1, the wireless devices 126 are represented by cylinders. The cylinders are intended to represent any type of wireless device that is configured to communicate with another device through wireless communications and needs to communicate with at least one other device to share information to enable two or more wireless communications devices to securely share wirelessly transmitted data. For instance, the devices may share an encryption key or other security information prior to communicating. Alternatively, the encryption key or security information may be changed or updated periodically to increase the security of the communication. In another embodiment, the wireless devices can be placed within the enclosure 102 to receive a software or firmware upgrade.

In the example embodiment illustrated in FIG. 1, the shielding layer 106 is shown located on the outer walls of the interior area of the pairing enclosure 102. However, the shielding layer may also be located on the outer walls of the exterior of the enclosure, or within the walls of the enclosure. The shielding layer can comprise more than one layer of material may to minimize radio frequency signal and magnetic field leakage from escaping the enclosure. The shielding layer can be substantially continuous across the surfaces of the enclosure to minimize the leakage of radio waves from the enclosure. The pairing enclosure 102 and the shielding layer can be connected to a common ground.

A lid 110, configured to fit over an open end of the pairing enclosure 102, also includes a shielding layer 106. When the lid is closed, the layer(s) of shielding material located on, or within each wall of the enclosure act to form a shielded region in which the wireless devices 126 can be placed. A flexible metallized seal 114 can also be included to minimize any gaps that may occur between the lid 110 and the enclosure 102 when the lid is shut. A latching mechanism 118 can be used to provide a relatively tight seal between the lid and the enclosure when the lid is shut. The latching mechanism 118 shown in FIG. 1 is for exemplary purposes only. Any type of latching mechanism operable to keep the lid 110 in contact with the body of the enclosure 102 can be used.

The shielding layer 106 can be formed of a solid metal material such as a foil, or a mesh material such as a metallic screen. The size of the holes in the mesh material can be selected to have a major dimension that is less than a wavelength of the radio frequency (RF) signals emitted by the wireless devices during the pairing procedure. The major dimension of the holes in the mesh material will typically be less than one half of the wavelength of the RF signals emitted by the wireless devices, although the major dimension may be substantially smaller, such as $\frac{1}{20}^{th}$, $\frac{1}{1000}^{th}$ of the wavelength, or smaller.

In one embodiment, the layer of shielding material 106 can be formed using a substantially conductive metal such as silver, copper, aluminum, nickel, or gold. A high conductivity metal can create a Faraday cage within the enclosure 102.

The layer of shielding material 106 can include a material having high magnetic permeability to substantially attenuate magnetic fields to attenuate signals transmitted through magnetic induction. Materials with a high magnetic permeability include Mu metal and ferrite tiles.

The layer of shielding material can also include other types of radiation absorbent materials, such as metallized plastic or paper products, carbon materials, doped semiconductors, or other types of radiation absorbent material. Radiation absorbent material can be a material designed to absorb radio frequency signals rather than reflecting them. Radiation absorbent materials can comprise arrays of pyramid shaped pieces, each of which is constructed from a suitably lossy material. To work effectively, substantially all of the internal surfaces of the pairing enclosure 102 can be covered with radiation absorbent materials. To be sufficiently lossy, the radiation absorbent material can neither be a good electrical conductor nor a good electrical insulator as neither type actually absorbs any power. It can be an intermediate grade of material which absorbs power gradually in a controlled way as the incident wave penetrates it. Typically pyramidal radiation absorbent material comprises a rubberized foam material impregnated with controlled mixtures of carbon.

Any type of material may be used to form the layer(s) of shielding material 106 that provides a desired level of attenuation of radio frequency signals and/or magnetic fields emitted by the wireless devices 126 placed within the enclosure 102 for pairing. For instance, a relatively simple pairing enclosure 102 may have a shielding material 106 comprised of a metallic screen. A more complex pairing enclosure 102 can have a plurality of shielding materials 106 such as an inner layer of radiation absorbent material nearest the wireless devices to absorb signals transmitted by the devices, followed by a layer of ferrite tiles and/or Mu metal to shield magnetic field emissions from an inductive based communication system, followed by a conductive layer to form a Faraday cage to reflect any electromagnetic signals that were not attenuated by the radiation absorbent material.

The system 100 can further comprise a test signal transmitter 122 located within the pairing enclosure 102. The test signal transmitter may be a radio frequency transmitter or a magnetic inductive transmitter configured to transmit a test pairing signal. The test pairing signal may be a simple, single frequency tone emitted at a power level and frequency that is substantially similar to the signal emitted wireless devices 126 when the pairing procedure takes place.

The test pairing signal emitted by the test transmitter 122 may also be a more complex signal, such as a signal comprising a plurality of frequencies and power levels. The test signal may also simulate the modulation scheme used by the wireless devices. Complex modulation schemes, such as those used by digital wireless devices to transmit data, can create many unintended frequency components. By simulating the modulation scheme of the signals communicated during the pairing procedure, the pairing enclosure 102 can be tested more thoroughly to verify that no radio frequency signals of consequence escape the enclosure with an undesired power level during the pairing procedure.

The system 100 can further comprise a pairing signal receiver 130 located external to the pairing enclosure 102. For example, FIG. 1 shows the pairing signal receiver 130 coupled to the pairing enclosure 102. The pairing signal receiver can also be located a selected distance from the pairing enclosure. Measurements can be made to determine an optimal placement for the pairing signal receiver relative to the pairing enclosure to receive the test pairing signal emitted by the test signal transmitter 122.

The pairing signal receiver 130 is configured to detect a power level of the test pairing signal emitted by the test signal transmitter 122 from within the pairing enclosure 102. When the power level of the test pairing signal, as measured by the pairing signal receiver, is less than a predetermined power level, then one or more wireless devices 126 can be securely paired within the pairing enclosure 102.

For example, during the pairing procedure, one or more wireless devices 126 may be configured to transmit an Orthogonal Frequency Division Multiplexing (OFDM) signal with quadrature amplitude modulation (QAM) at a center frequency of 2.45 GHz and a bandwidth of 500 KHz with a power level of 0 dBm (the power ratio in decibels (dB) of the measured power referenced to one milliwatt). In one embodiment, the test signal transmitter 122 can be configured to transmit a single frequency tone at a power level of 0 dBm and at a frequency of 2.45 GHz. Alternatively, the test signal transmitter can be configured to transmit an OFDM signal having QAM at a center frequency of 2.45 GHz and a bandwidth of 500 KHz to simulate the more complex signal transmitted by the wireless devices.

In addition, the test signal transmitter 122 can transmit a test pairing signal with a greater power level than the wireless devices 126 typically transmit at when pairing. For example, the test pairing signal may be transmitted at a power level of 3 dBm when the wireless devices transmit a 0 dBm signal when pairing. The higher power test signal can provide added assurance that the signals transmitted by the wireless devices during the pairing procedure will not be detected by unwanted parties.

The pairing signal receiver 130 is configured to receive the test signal transmitted by the test signal transmitter 122 and to analyze the signal. The pairing signal receiver can verify that the power level of the test pairing signal at the pairing signal receiver is less than a predetermined level. For example, a threshold level of −60 dB of attenuation may be desired. If the test pairing signal (0 dBm) is transmitted through the pairing enclosure and is measured at the pairing signal receiver to have a maximum power that is less than −60 dBm, then the pairing signal receiver can indicate that the pairing enclosure is properly sealed.

The actual threshold level is dependent on the power output of the devices being paired. For example, high power radios having an output of +30 dBm may require a reduction in power of 90 dB to −60 dBm. The pairing enclosure 102 can be configured to provide a desired amount of attenuation. Multiple layers of shielding material 106 may be used to further increase the power level drop between the inside and outside of the pairing enclosure for enclosures designed to work with high power wireless devices. However, most devices will conduct the pairing procedure using a relatively low power signal, even if they are configured to transmit at relatively high power levels.

While the example in FIG. 1 has illustrated and described the test signal transmitter 122 as being located within the pairing enclosure 102, and the pairing signal receiver 130 as being located outside the pairing enclosure, the system 100 can similarly function with the test signal transmitter 122 being located outside of the pairing enclosure 102 and the pairing signal receiver being located within the pairing enclosure 102. As long as the transmitter 122 and receiver 130 are located on opposite sides of the pairing enclosure, the system can function as described.

Once the pairing signal receiver 130 indicates that the pairing enclosure 102 is properly sealed, the one or more wireless device(s) 126 can be paired within the pairing enclosure.

While the system 100 can be configured to enable a test to be performed prior to performing a pairing procedure, it may not be necessary to run a test each time the system is used. The pairing signal receiver 130 can be configured to measure the pairing signal(s) transmitted from the wireless devices 126 (and/or any other transmitters) involved in the pairing procedure. The pairing signal receiver can be in communication with the wireless devices and/or transmitters involved in the pairing procedure. The control signal can be electronically communicated from the pairing signal receiver to enable the pairing procedure to be initiated, proceed, and/or be terminated based on the measured power level of the pairing signal(s) transmitted through the pairing enclosure during the pairing procedure. The power level of the pairing signal(s) is typically measured by the pairing signal receiver 130.

The actual power level at which the system is configured to initiate a pairing procedure, proceed with a pairing procedure that has already been initiated, or terminate a pairing procedure is dependent on the design and specifications of the wireless devices being paired. An example has been given of an expected 60 dB drop in power level of the pairing signal through the pairing enclosure. However, the actual drop in power level can widely vary. In some instances, a fairly small drop of 12 dB may be sufficient. In other situations, a drop of 100 dB or greater may be requires. A user can determine the power levels for each desired operation based on the environment in which the pairing procedure on the wireless devices 126 is being conducted.

In one non-limiting example, the user may be deep in enemy territory, making it important that detection of any type of signal be minimized to avoid detection by the enemy. The pairing signal receiver 130 can be configured to expect a 90 dB drop from the 0 dBm power of the pairing signal transmitted by the wireless devices (or pairing transceiver) during the pairing procedure. If the pairing signal is measured during the pairing procedure as having a power less than or equal to −90 dBm, the control signal can be used to allow the pairing procedure to proceed. If the pairing signal is measured at a range that is nominally greater than −90 dBm, such as less than or equal to −80 dBm, then the control signal can be used to activate a noise generator to mask the pairing signal. If the pairing signal is measured having a power level outside the pairing enclosure 102 that is equal to or greater than −79 dBm then the control signal can be used to terminate the pairing procedure.

Other ranges may be selected by the user based on attenuation needs and wireless device power output. The design of the pairing enclosure can be adjusted to deliver the desired attenuation. A pairing enclosure can be designed to deliver a greater level of attenuation by including multiple shielding layers and selecting materials that provide a greater level of attenuation, such as radiation absorbing material (RAM). Conversely, pairing enclosures that are designed to deliver a lower level of attenuation, such as 30 dB, can be constructed more to be less costly by using inexpensive materials that are able to provide the desired levels of attenuation.

An indicator 134 on the pairing signal receiver may be used to show when the pairing enclosure is properly sealed based on the measured power level of the pairing signals transmitted during the pairing procedure. The indicator can also be used to show when pairing has been successfully completed. The indicator may also be located on the pairing enclosure 102. In one embodiment, the pairing enclosure may have an electrically activated lock to ensure that the lid 110 cannot be opened when pairing of wireless devices is taking place.

The indicator 134 can be a visual indicator, such as a light, a video display, or the like that is used to indicate a power level of the pairing signal or test pairing signal. The indicator can provide a visual indication that enables a user to determine that the pairing procedure can be prohibited from beginning, begin, proceed, and be terminated based on the power level of the pairing signal that is detected by the pairing signal receiver. For instance, the indicator may be a light emitting diode displaying different colors based on the power level, such as green for less than a predetermined level, yellow for within a selected range of the predetermined level, and red for greater than the selected range. The indicator may also be a video screen or LED display that shows the actual measured power level or amount of attenuation of the pairing signal or test pairing signal. This enables the user to make informed choices regarding conducting the pairing procedure.

The indicator may also be a control signal that can be electronically communicated to enable the pairing procedure to be initiated, conducted, and/or terminated based on the power level. Using a control signal can significantly increase the speed of activating or terminating the pairing procedure based on the power level of the pairing signal or test pairing signal.

In another embodiment, a window 138 may be included in the pairing enclosure 102 to enable the wireless devices 126 to be viewed. Many types of wireless devices are configured to provide visual indicators related to the operation of the device. For example, a wireless device may have an indicator LED light that blinks 3 times if pairing failed for a selected reason. The indicator light may turn on for a selected time period, such as 2 seconds, if pairing is successful. By placing a window in the pairing enclosure it can be easier to debug any problems that may occur with the wireless devices in the pairing procedure. A user can also determine when pairing has been successfully completed.

A layer of shielding material 146, such as a wire mesh made of a conductive material and/or a material having high magnetic permeability, can be adhered to the window 138 to provide reflection and/or attenuation of the signals emitted by each wireless device 126 during the pairing procedure. The conductive material 146 may be the same or different than the conductive material 106. For example, a solid foil may be applied to the surfaces of the pairing enclosure while a mesh screen may be applied to the window to allow a user to view the wireless devices 126 in the pairing enclosure 102 when the enclosure is sealed.

The transmitter 122 and receiver 130 can be in communication with each other to enable feedback from the test. For example, in one embodiment the pairing signal receiver 130 can indicate that a test is successful only when a notification signal is first received from the test signal transmitter containing information that a test pairing signal has been sent. The connection may be wired or wireless. A wired connection between the transmitter and receiver may be most beneficial so that the layer(s) of shielding material 106 do not interfere with the connection. When the notification signal is received, and the test pairing signal is measured at the pairing signal receiver 130 as having a power level less than the threshold, then an indicator 134 can show that the test is successful. The indicator can also be a signal communicated from the pairing signal receiver to the test signal transmitter that the pairing procedure can be initiated and/or conducted or terminated. If there is no communication between the transmitter and receiver, it may be difficult to determine at the receiver whether a test pairing signal was sent. This is especially true when substantially low power signals are measured, or when electronic noise is present that may be picked up by the receiver. In addition, the test signal transmitter 122 can also include an indicator 124 that may be viewed through the window 138 to verify that the transmitter is sending a test pairing signal.

In another embodiment, one of the wireless devices 126 can be used as the test signal transmitter. A user can activate one or more wireless devices to send a test signal. The test signal may be a specific signal, or an actual pairing signal sent with an incorrect code or cryptography algorithm. When the lid 110 on the pairing enclosure 102 is closed and sealed, a measurement can be made at the pairing signal receiver 130 to determine if the test pairing signal is less than the threshold. If so, the user can pair all of his or her devices using a desired code or cryptography algorithm. Using one of the wireless devices 126 to send the test pairing signal can significantly reduce the complexity of the system since there is no need to replicate a signal of the wireless device. This is especially true of high power signals, or wherein the system is used to pair a plurality of different kinds of wireless devices that operate at different powers, frequencies, and modulation schemes.

In one embodiment, the pairing signal receiver 130 can be configured to receive a near field magnetic induction (NFMI) signal that was transmitted by one of a wireless device 126 and the test signal transmitter 122. As with signals transmitted on electromagnetic waves, the pairing signal receiver 130 is configured to detect the NFMI signal and determine if it has been attenuated to be below a desired threshold.

In one embodiment, the pairing signal receiver 130 can continue to operate and measure any signals leaking from the pairing enclosure 102 during the pairing procedure of the one or more wireless devices 126. If a signal is measured that is significantly greater than the threshold power level, such as a signal that is 12 dB greater than the maximum allowable power output, a radio frequency noise generator 148 can be activated at a relatively high power that is sufficient to mask the signals leaking from the pairing enclosure 102. The noise generator 148 can be configured to operate at a similar frequency and bandwidth as the one or more wireless device(s) 126.

Alternatively, if the pairing signals emitted during the pairing procedure by the one or more wireless device(s) 126 located within the pairing enclosure 102 are measured by the pairing signal receiver 130, or another device located external to the pairing enclosure, to have power greater than the predetermined threshold, then the pairing procedure may be terminated.

In another example embodiment, a user can place his or her wireless devices 126 that need to be paired into the pairing enclosure 102, close the lid 110 and seal the enclosure with the latching mechanism 118. The user can activate a button 142 that may be located on the pairing signal receiver 130 or the enclosure 102. The button can activate an automatic test sequence in which the test signal transmitter 122 transmits a test pairing signal. The pairing signal receiver can attempt to receive the test pairing signal based on one or more of the selected frequency, bandwidth, power range, and modulation scheme. If no signal is received, or the signal that is received is less than the threshold power level, then pairing of the wireless devices can take place. Alternatively, if no signal is received then pairing of the wireless devices may only take place when a confirmation is received from the test signal transmitter 122 that a pairing signal was transmitted.

In one embodiment, the system 100 can include a test signal receiver 150 located on the same side of the pairing enclosure 102 as the test signal transmitter 122. The pairing signal receiver 130 can be located on the other side of the enclosure. The test signal receiver 150 is configured to receive the test signal transmitted by the test signal transmitter. If no test signal is received by the pairing signal receiver 130 located on the opposite side of the pairing enclosure, but the test signal is received by the test signal receiver 150, then it can be assumed that the pairing enclosure attenuated the signal below the pairing signal receiver's detection threshold and/or below the noise floor. In addition, when the test signal is detected by the paring signal receiver 130 then an accurate knowledge of the amount of attenuation of signals traveling through the pairing enclosure can be obtained by comparing the measurements made by the test signal receiver 150 and the pairing signal receiver 130. When the test signal is measured by the test signal receiver 150, but not by the pairing signal receiver 130, an indicator signal can be transmitted indicating that the test was successful and the pairing procedure can be initiated. However, if neither of the receivers successfully receive the test signal then it can be assumed that an error has occurred.

In another embodiment, the test signal transmitter 122 can be a pairing transceiver. The pairing transceiver can be configured to communicate with one or more wireless devices 126 located within the paring enclosure 102. The pairing transceiver can send a signal to the wireless device(s) instructing each device to perform a preconfigured pairing procedure. The pairing transceiver can communicate information to the wireless device(s) during the pairing procedure. The information can be used by the wireless devices to perform the pairing procedure. For instance, the pairing transceiver can communicate a public encryption key, a private encryption key, a transmission frequency at which the wireless device(s) will communicate, a data channel on which the wireless device(s) will communicate, a pairing identification number for each wireless device, a pseudorandom noise (PN) code, a modulation scheme, a frequency hopping schedule/map, a software update, a firmware update, or other types of proprietary information that are desired to be communicated during the pairing procedure. In one embodiment, the pairing transceiver and the test signal transmitter can be integrated into a single device that is capable of transmitting a test signal and communicating with the wireless device(s).

The wireless device(s) 126 can be configured to communicate with the pairing transceiver. For example, each wireless device can be configured to send an acknowledgement that it has received information from the pairing transceiver. Acknowledgements can also be communicated when the wireless devices have performed the desired actions in the pairing procedure, such as updating encryption keys, frequency, channel, and modulation information, and successfully performing software or firmware upgrades, and the like. If an acknowledgement is not received at the pairing transceiver, the information may be re-sent to the wireless device(s) that did not acknowledge. This can reduce the probability of a miscommunication that may keep a wireless device from receiving desired updates in the pairing procedure.

The pairing transceiver can also be configured to communicate selected information to a specific wireless device. For instance, during the pairing procedure, information can be communicated that is addressed to a specific wireless device. Any type of address information can be used to communicate the information to the specific wireless device, such as the device's Media Access Control (MAC) address or another desired addressing means, as can be appreciated. This enables each wireless device 126 located within the pairing enclosure to receive information specific for that wireless device during the pairing procedure.

The transmitter configured to communicate the information to one or more wireless devices in the pairing enclosure during the pairing procedure can have the information uploaded to the transmitting device in a reasonably secure fashion. For instance, the information can be communicated to the pairing transceiver or one of the wireless devices 126 through a network connection, a memory stick, through a fiber optic cable, or another secure means of uploading the information. The information can then be wirelessly transmitted only within the pairing enclosure to minimize the risk of transmitting the information to one or more unwanted parties.

Alternatively, the pairing procedure may not include any information communicated from the pairing transceiver to the wireless device(s) 126. Instead, multiple wireless devices 126 can communicate with the other wireless devices. Information can be shared to enable the wireless devices to be synchronized. One or more of the wireless devices can communicate additional information to the other devices in the pairing enclosure during the pairing procedure, including but not limited to the information previously discussed that can be communicated by the pairing transceiver.

In one embodiment, pairing of one or more wireless devices 126 in the pairing enclosure 102 can be accomplished by setting each desired wireless device, prior to shutting the lid 110, to pair within a predetermined time period, such as after one minute. The pairing enclosure can then be tested, as previously described. Such testing may be accomplished in a predetermined time period, such as within 15-30 seconds depending on the power level to be detected by the pairing signal receiver 130. If the pairing signal receiver indicates a failure, then the pairing of the wireless devices can be cancelled. If the pairing signal receiver indicates a successful test, then pairing can be allowed to proceed.

In one embodiment, the pairing procedure can involve transmitting information from a master transmitter/receiver that is used to communicate information to the one or more wireless devices 126. The master transmitter/receiver may be separate from the test signal transmitter 122. Alternatively, the test signal transmitter may also be configured to transmit desired pairing information. On the other hand, the wireless devices may pair to each other without the need for any information from an external device. In another embodiment, initiation of the pairing procedure may occur via a communication to and from an external source or trigger or by a communication from another wireless device 126 to be paired.

Alternatively, the wireless devices 126 can be configured to receive a wireless signal from the test signal transmitter 122 indicating that the pairing procedure can be conducted. This signal will then only be sent after a successful test is reported by the pairing signal receiver 130 to the test signal transmitter 122. The test signal transmitter will then send a signal to the wireless devices 126 located within the sealed pairing enclosure 102. Completion of pairing can be determined based on visual indicators on the wireless devices 126 as seen through a window 138, based on an indicator 134 viewable outside the enclosure 102, or after a selected period of time has passed.

In another embodiment, the pairing enclosure 102 can include a mechanical means to enable a user to interface with the wireless devices 126 located in the pairing enclosure 102. For instance, a pass-through switch or a shielded hand/arm access glove or port can be included in the pairing enclosure to allow the user to physically interact with the wireless devices 126. This can enable the user more flexibility in interacting with one or more wireless device prior to, during, and after the pairing procedure has been initiated.

In another embodiment, the pairing enclosure can include an optical link that enables an optical signal to be transmitted to the wireless devices 126 located within the pairing enclosure 102. The optical link may be transmitted through a substantially optically transparent material, such as the window 138. Alternatively, an optical receiver 152 located on the outside of the pairing enclosure can be wired to an optical transmitter (not shown) located on the inside of the pairing enclosure. The optical receiver and transmitter can act as an optical repeater configured to relay any optical signals transmitted outside of the pairing enclosure to the wireless devices inside.

Similarly, a radio frequency antenna 156 can be coupled to a transceiver located within the pairing enclosure 102 and used to relay wireless signals transmitted outside of the pairing enclosure to the wireless devices 126 to enable signals to be communicated to the wireless devices even when the pairing enclosure is fully closed.

In one embodiment, the plurality of wireless devices 126 can be inserted into the enclosure while attached to an object. For example, a soldier operating in a battlefield may have a plurality of wireless devices attached to his or her vest and helmet. The soldier may place the vest and helmet into the enclosure 102 and proceed to pair the electronic devices within the enclosure, as discussed above, while they are still attached.

Figure 2:
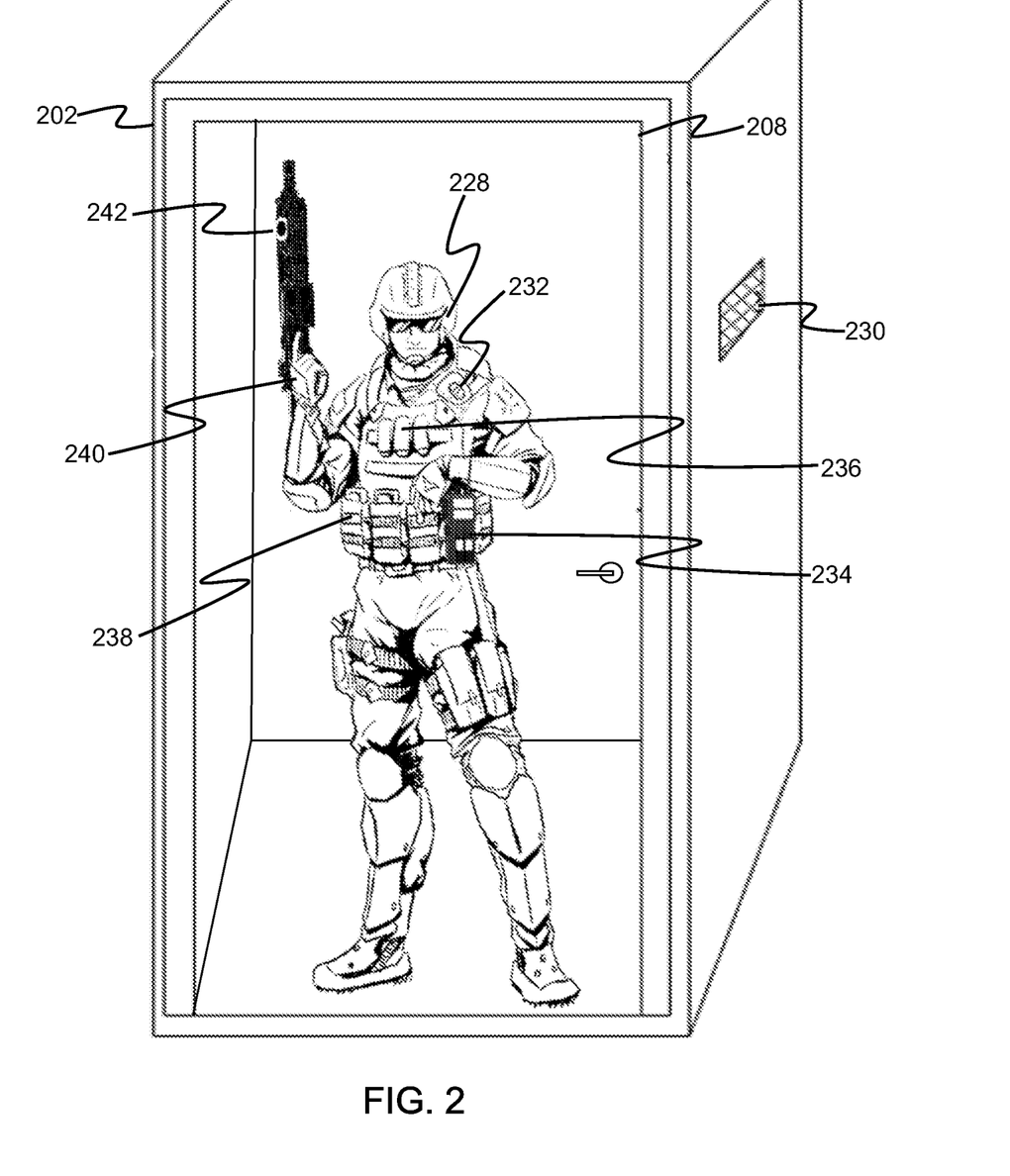
FIG. 2 illustrates a walkable pairing enclosure for securely pairing a wireless device using wireless communication in accordance with an embodiment of the present invention.

FIG. 2 shows an example embodiment illustration of a pairing enclosure 202 having a greater size than the pairing enclosure 102 shown in FIG. 1. In this example embodiment, a person can walk into the enclosure 202 with the plurality of wireless devices attached. For instance, a soldier is shown wearing a plurality of wireless devices. The soldier is wearing a wireless headset 228, a wireless gun detection device 232, a wireless audio radio adaptor 234 configured to communicate with the wireless headset 226 using near field magnetic induction, a wireless biometric measurement device 236, a remote radio push to talk device 238, a weapon mounted remote interface controller 240, and a weapon mounted remote push-to-talk device 242. Each of these devices may need to be paired while the soldier is in the field. During the pairing procedure, non-encrypted information can be communicated, such as an encryption key, security information, or a software or firmware upgrade, as previously discussed. The pairing enclosure 202 can be used to protect the wireless transmission of critical, non-encrypted information to the wireless devices. This information can then be used by the wireless devices to securely communicate in the field.

The pairing enclosure 202 shown in the example embodiment of FIG. 2 can operate in the same fashion as the smaller pairing enclosure 102. The pairing enclosure 202 can include one or more layers of shielding material to substantially attenuate a radio frequency signal or magnetic field emitted within the pairing enclosure. The layer(s) of shielding material can be located on an inside of each surface, an outside of each surface, or somewhere in between. Multiple layers of shielding materials can be used to increase the amount of attenuation of a signal passing through a surface of the enclosure. A door 208 enables a person to enter the pairing enclosure. The door includes at least one layer of the shielding material. A flexible shielding seal, similar to the seal 114 in FIG. 1, can be placed near a perimeter of the door and act as weather stripping that can minimize radio frequency and magnetic field leakage from any openings between the door and the enclosure 202. A test signal transmitter similar to the transmitter 122 is located within the pairing enclosure and configured to transmit a test pairing signal.

A pairing signal receiver 230 is located external to the pairing enclosure and configured to detect a power level of the test pairing signal emitted within the pairing enclosure. The pairing signal receiver is coupled to the test signal transmitter. In one embodiment, the pairing signal receiver can send a signal to the test signal transmitter when the test pairing signal is determined to be less than a predetermined threshold level. The test signal transmitter can then send a signal to the wireless devices instructing the devices that the pairing procedure can begin.

Alternatively, the pairing signal receiver 230 can send a signal when the test pairing signal is determined to be less than a predetermined level. The signal can light an indicator (not shown) within the pairing enclosure 202, indicating to the person within the enclosure that the pairing procedure can begin. The person can then manually perform the pairing procedure on his or her wireless devices once the indicator shows that the pairing enclosure is properly sealed. Alternatively, a signal may be communicated to the test signal transmitter, the wireless devices, or another transmitter within the enclosure 202 that automatically initiates the pairing procedure, as previously discussed.

While a rectangular shaped pairing enclosure 202 is shown in FIG. 2, the shape of the enclosure is not important. Any shape of enclosure that provides sufficient attenuation of a pairing signal produced by a wireless device can be used. For example, a pairing enclosure may be formed with two circular frames having a conductive mesh screen connected to the circular frames so as to surround the top, bottom, and sides of the frames.

Additional types of pairing enclosures can also be constructed to provide an enclosure in which multiple wireless devices can be paired while minimizing transmission of the pairing signal. For example, a pairing enclosure may be constructed in the form of a vehicle holding room such as a permanent garage or a temporary tent structure large enough to enable at least one vehicle to enter. The pairing enclosure can be a walkable enclosure (i.e. an enclosure large enough for a person to walk into), a box, a dome, a sphere, a tent, a teepee, a poncho, an overcoat and so forth. In each case, the pairing enclosure includes a layer of shielding material forming a shielded region to substantially attenuate a radio frequency signal or magnetic field emitted within the pairing enclosure during the pairing procedure.

When the pairing enclosure is wearable, such as the poncho, the enclosure is designed to substantially enclose at least a portion of the person wearing it. For example, the poncho can have a substantially snug fit around a person's neck, and a flap at the bottom of the poncho that can be secured around a person's legs. The poncho includes at least one layer of shielding material. Once the poncho is secured on a person, the person can first send a test pairing signal. A pairing signal receiver located outside the poncho can be used to determine whether the test pairing signal is received that is greater than the predetermined threshold, as previously discussed. If the test pairing signal is greater, then the top and bottom of the poncho can be checked and better secured on the person. The test can then be repeated until the test pairing signal at the pairing signal receiver is less than the predetermined level. The person can then proceed to pair the plurality of wireless devices on the person that are located within the poncho.

As previously discussed, in each of the example embodiments disclosed herein, the pairing signal receiver may be located on one of an outside and an inside of the pairing enclosure, with the test signal transmitter located on the opposite side of the pairing enclosure.

Figure 3:
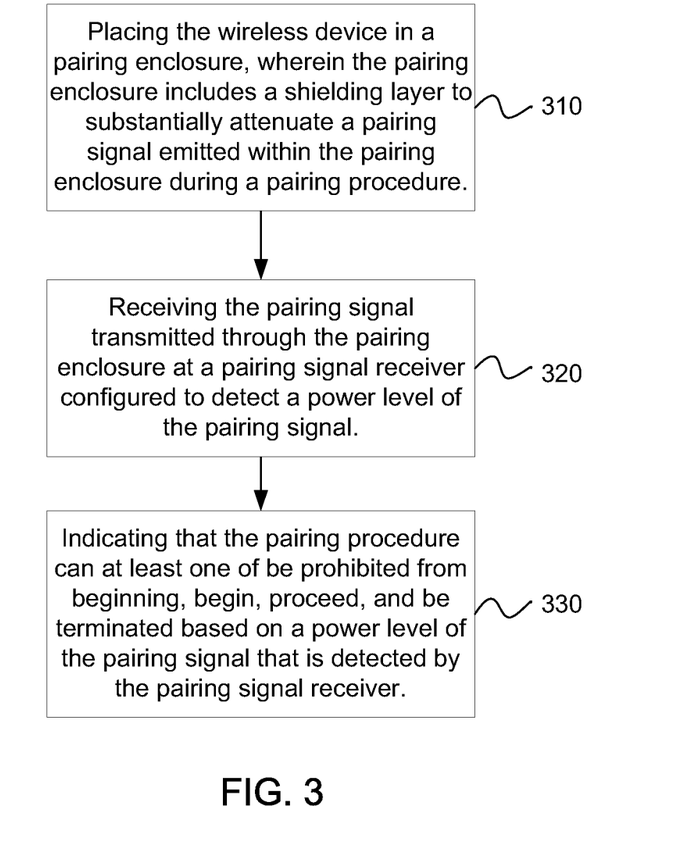
FIG. 3 depicts a method for securely pairing a wireless device in accordance with an embodiment of the present invention.

In another embodiment, a method for pairing a plurality of wireless devices is disclosed, as depicted in the flow chart of FIG. 3. The method comprises the operation of placing 310 the wireless device in a pairing enclosure. The pairing enclosure includes a shielding layer to substantially attenuate a pairing signal emitted within the pairing enclosure during a pairing procedure. The pairing signal transmitted through the pairing enclosure is received 320 at a pairing signal receiver that is configured to detect a power level of the pairing signal. An indication 330 is made that the pairing procedure can be prohibited from beginning, begin, proceed, and be terminated based on the power level of the pairing signal that is detected by the pairing signal receiver.

The use of wireless devices can substantially increase efficiencies and provides many conveniences. However, the information transmitted by wireless devices is typically desired to remain private. To enable private transmission of wireless data, encryption and pairing procedures can be used. When encryption and pairing information are shared between wireless devices, they are typically at their most vulnerable. To enable wireless pairing to take place between multiple wireless devices, while minimizing the detection of the pairing scheme, a pairing enclosure can be used as described above.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for securely pairing a wireless device using wireless communication, comprising:
   a pairing enclosure having at least one shielding layer to substantially attenuate a pairing signal emitted within the pairing enclosure during a pairing procedure;
   a test signal transmitter to transmit a test pairing signal through the pairing enclosure and a notification signal indicating that the test pairing signal has been transmitted through the pairing enclosure;
   a pairing signal receiver to determine an amount of attenuation of the test pairing signal, upon receiving the notification signal from the test signal transmitter, by detecting a power level of the test pairing signal transmitted through the pairing enclosure to the pairing signal receiver; and
   an indicator operable to receive a signal from the pairing signal receiver, the signal indicating when a power level of the test pairing signal measured by the pairing signal receiver is within a predetermined power level range in order to begin the pairing procedure, the signal indicating when the power level of the test pairing signal is outside the predetermined power level range and that the power level of the test pairing signal should be adjusted until the test pairing signal is within the predetermined power level range in order to begin the pairing procedure.

2. The system of claim 1, wherein the test signal transmitter is located within the pairing enclosure and the pairing signal receiver is located external to the pairing enclosure.

3. The system of claim 1, wherein the test signal transmitter is integrated within the wireless device.

4. The system of claim 1, wherein the test signal transmitter is configured to transmit pairing information to the wireless device.

5. The system of claim 1, wherein the test signal transmitter is located at one of internal to the pairing enclosure and external to the pairing enclosure and the pairing signal receiver is located at one of external to the pairing enclosure and internal to the pairing enclosure, respectively, to enable the pairing signal receiver to measure an attenuation of the test pairing signal transmitted by the test signal transmitter after the signal travels through the pairing enclosure.

6. The system of claim 5, further comprising a test signal receiver located on a same side of the pairing enclosure with the test signal transmitter.

7. The system of claim 1, wherein the test pairing signal is emitted as at least one of a single frequency, a plurality of frequencies, and a modulated signal to determine an amount of attenuation provided by the pairing enclosure.

8. The system of claim 1, wherein the test signal transmitter is electrically connected to the pairing signal receiver and the indicator indicates one of a successful test and an unsuccessful test based on the predetermined power level.

9. The system of claim 1, further comprising a pairing transceiver located within the pairing enclosure, the pairing transceiver configured to communicate with the wireless device during the paring procedure.

10. The system of claim 9, wherein the pairing transceiver is configured to transmit pairing information to the wireless device during the pairing procedure.

11. The system of claim 10, wherein the pairing information is selected from the group consisting of a public encryption key, a private encryption key, a transmission frequency, a data channel, a pairing identification number, a pseudorandom noise (PN) code, a modulation scheme, a frequency hopping schedule, a software update, and a firmware update.

12. The system of claim 1, wherein the pairing signal is emitted by the wireless device.

13. The system of claim 1, wherein the pairing signal is a radio frequency signal.

14. The system of claim 1, wherein the pairing signal is a near field magnetic induction signal.

15. The system of claim 1, wherein the indicator is further operable to transmit a control signal indicating to the system when the pairing procedure can be initiated, proceed, or be terminated based on the power level of the pairing signal.

16. The system of claim 1, wherein the at least one shielding layer is comprised of a radio frequency shielding material.

17. The system of claim 1, wherein the at least one shielding layer is comprised of a magnetic field shielding material.

18. The system of claim 1, wherein the at least one shielding layer is comprised of at least one of a foil shielding material and a mesh shielding material.

19. The system of claim 1, wherein the at least one shielding layer is formed from at least one material selected from the group consisting of gold, silver, aluminum, copper, nickel, Mu metal, ferrite tile, a radiation absorbing material, conductive carbon, doped semiconductor, metallized plastic, and metallized paper products.

20. The system of claim 1, wherein the pairing enclosure is an enclosure selected from the group consisting of a vehicle holding room, a walkable enclosure, a box, a dome, a sphere, a tent, a teepee, a poncho, and an overcoat.

21. The system of claim 1, wherein the pairing enclosure further comprises a window configured to enable a user to view the wireless devices within the pairing enclosure.

22. The system of claim 21, wherein the window includes at least one of a layer of mesh conductive material and a layer of mesh material formed from a Mu metal to form at least one shielding layer to substantially attenuate at least one of a radio frequency signal and a magnetic field emitted from within the pairing enclosure.

23. The system of claim 1, further comprising a mechanical interface to enable a user to physically manipulate the wireless device located in the pairing enclosure.

24. The system of claim 23, wherein the mechanical interface is used to initiate a pairing procedure for the wireless device in the pairing enclosure.

25. The system of claim 1, wherein the pairing enclosure is a portable environment configured to enable a person to walk into.

26. The system of claim 1, wherein the pairing enclosure is an enclosure with a lid that has a sufficient size to contain a plurality of the wireless devices.

27. The system of claim 26, wherein the shielding layer further comprises a flexible shielding seal placed between the lid and the pairing enclosure and configured to minimize leakage of the pairing signal when the lid is secured against the pairing enclosure.

28. The system of claim 1, wherein the pairing enclosure is wearable by a person.

29. The system of claim 1, further comprising a noise source configured to transmit a noise signal to mask the pairing signal transmitted in the pairing enclosure.

30. The system of claim 29, wherein the noise source is configured to transmit the noise signal to mask the pairing signal when the pairing signal is measured by the pairing signal receiver to be greater than a predetermined power level.

31. The system of claim 1, wherein the indicator is a control unit configured to:
   allow the pairing procedure to proceed when the power level is less than a predetermined power level; and terminate the pairing procedure when the power level is greater than a predetermined power level.

32. A method for pairing a wireless device, comprising:
placing the wireless device in a pairing enclosure, wherein the pairing enclosure includes a shielding layer to substantially attenuate a test pairing signal emitted from a test signal transmitter within the pairing enclosure to a pairing signal receiver during a pairing procedure;
receiving the test pairing signal transmitted through the pairing enclosure at the pairing signal receiver and a notification signal indicating that the test pairing signal has been transmitted through the pairing enclosure, wherein the pairing signal receiver is configured to determine an amount of attenuation of the test pairing signal upon receiving the notification signal by detecting a power level of the test pairing signal; and
indicating that the pairing procedure is prohibited from beginning when the power level of the test pairing signal is outside a predefined range and that the power level of the test pairing signal should be adjusted so that the power level of the test pairing signal is within the predefined range in order to begin the pairing procedure.

33. The method of claim 32, wherein the test signal transmitter is located within the pairing enclosure and the pairing signal receiver is located external to the pairing enclosure.

34. The method of claim 32, further comprising transmitting pairing information to the wireless device in the pairing enclosure when the power level of the pairing signal at the pairing signal receiver is less than a predetermined power level.

35. The method of claim 34, wherein the pairing information is selected from the group consisting of a public encryption key, a private encryption key, a transmission frequency, a data channel, a pairing identification number, a pseudorandom noise (PN) code, a modulation scheme, a frequency hopping schedule, a software update, and a firmware update.

36. The method of claim 33, further comprising connecting the test signal transmitter and the pairing signal receiver to enable a signal to be sent from the test signal transmitter to the pairing signal receiver indicating that the test pairing signal has been transmitted.

37. The method of claim 33, further comprising transmitting the pairing signal from at least one of the wireless device, the test signal transmitter, and a pairing transceiver.

38. The method of claim 32, wherein indicating further comprises sending a control signal such that that the pairing procedure can at least one of be prohibited from beginning, begin, proceed, and be terminated based on the power level of the pairing signal that is detected by the pairing signal receiver.

39. The method of claim 32, wherein indicating further comprises displaying a visual indication to enable a user to determine that the pairing procedure can at least one of be prohibited from beginning, begin, proceed, and be terminated based on the power level of the pairing signal that is detected by the pairing signal receiver.

40. A system for securely pairing a plurality of wireless devices using wireless communication, comprising:
a pairing enclosure having a shielding layer to substantially attenuate a pairing signal emitted within the pairing enclosure to a pairing signal receiver located external to the pairing enclosure during a pairing procedure; and
a test signal transmitter configured to transmit a test pairing signal and a notification signal through the pairing enclosure to the pairing signal receiver, the notification signal indicating that the test pairing signal has been transmitted through the pairing enclosure,
wherein the pairing signal receiver is configured to detect a power level of the test pairing signal upon receiving the notification signal,
wherein the pairing signal receiver is configured to indicate when the power level of the test pairing signal is greater than a predetermined power level and that the power level of the test pairing signal should be adjusted so that the power level of the test pairing signal is less than the predetermined power level, and
wherein the pairing procedure is started upon indication that the power level of the test pairing signal is less than the predetermined power level.

* * * * *